US012639073B2

(12) United States Patent    (10) Patent No.:   US 12,639,073 B2

Gaspar et al.    (45) Date of Patent:    May 26, 2026

(54) RETURN ADDRESS RESTORATION

(71) Applicant: Arm Limited, Cambridge (GB)

(72) Inventors: Francisco João Feliciano Gaspar, Cambridge (GB); Sumanth Chengad Raghu, St Ives (GB); Jatin Bhartia, Cambridge (GB)

(73) Assignee: Arm Limited, Cambridge (GB)

( * ) Notice: Subject to any disclaimer, the term of this patent is extended or adjusted under 35 U.S.C. 154(b) by 129 days.

(21) Appl. No.: 18/425,239

(22) Filed: Jan. 29, 2024

(65) Prior Publication Data

US 2025/0245010 A1    Jul. 31, 2025

(51) Int. Cl.
   *G06F 9/38*      (2018.01)
(52) U.S. Cl.
   CPC .......... *G06F 9/3806* (2013.01); *G06F 9/3861* (2013.01)
(58) Field of Classification Search
   None
   See application file for complete search history.

(56) References Cited

U.S. PATENT DOCUMENTS

| | | | | | |
|---|---|---|---|---|---|
| 5,136,696 | A | * | 8/1992 | Beckwith | G06F 9/4486 |
| | | | | | 712/240 |
| 5,964,868 | A | * | 10/1999 | Gochman | G06F 9/323 |
| | | | | | 712/237 |
| 6,151,671 | A | * | 11/2000 | D'Sa | G06F 9/30054 |
| | | | | | 712/202 |
| 6,886,093 | B2 | * | 4/2005 | Henry | G06F 9/3848 |
| | | | | | 712/237 |
| 6,895,498 | B2 | * | 5/2005 | McDonald | G06F 9/3806 |
| | | | | | 711/204 |

(Continued)

FOREIGN PATENT DOCUMENTS

| | | | | | |
|---|---|---|---|---|---|
| WO | WO-2006026510 | A2 | * | 3/2006 | G06F 9/3848 |

OTHER PUBLICATIONS

Machine Translation of Taiwan Patent Application TW 530261 B, published 2001. (Year: 2001).*

(Continued)

*Primary Examiner* — Steven G Snyder
(74) *Attorney, Agent, or Firm* — NIXON & VANDERHYE P.C.

(57)      ABSTRACT

An apparatus comprises speculative return address tracking circuitry to maintain a speculative call return stack structure to track speculative return addresses predicted based on speculative program flow; branch prediction circuitry to predict a target address of a return branch instruction based on the speculative call return stack structure; committed return address tracking circuitry to maintain a committed call return stack structure to track committed return addresses detected based on committed program flow for instructions executed by processing circuitry; and return address restoration circuitry responsive to a pipeline flush event to perform return address restoration based on one or more committed return addresses from the committed call return stack structure to prevent the branch prediction circuitry using one or more cancelled speculative return addresses of the speculative call return stack structure for predicting the target address of the return branch instruction. The committed call return stack structure has a smaller capacity for storing return addresses than the speculative call return stack structure.

20 Claims, 12 Drawing Sheets

(56) References Cited

U.S. PATENT DOCUMENTS

| | | | | |
|---|---|---|---|---|
| 6,898,699 B2* | 5/2005 | Jourdan | G06F 9/30054 | 712/E9.055 |
| 7,134,005 B2* | 11/2006 | Henry | G06F 9/323 | 712/240 |
| 7,165,169 B2* | 1/2007 | Henry | G06F 9/323 | 712/240 |
| 7,178,010 B2* | 2/2007 | McDonald | G06F 9/3861 | 712/225 |
| 7,200,740 B2* | 4/2007 | Henry | G06F 9/323 | 712/E9.06 |
| 7,320,066 B2* | 1/2008 | Yokoi | G06F 9/3844 | 712/240 |
| 7,328,332 B2* | 2/2008 | Tran | G06F 9/3816 | 712/E9.046 |
| 7,398,377 B2* | 7/2008 | McDonald | G06F 9/3806 | 711/204 |
| 7,752,426 B2* | 7/2010 | Nye | G06F 9/3848 | 712/240 |
| 7,890,735 B2* | 2/2011 | Tran | G06F 1/3296 | 712/20 |
| 7,975,132 B2* | 7/2011 | Bean | G06F 9/30054 | 712/234 |
| 8,250,349 B2* | 8/2012 | Inoue | G06F 9/3844 | 712/242 |
| 8,423,751 B2* | 4/2013 | Henry | G06F 9/323 | 712/233 |
| 9,015,504 B2* | 4/2015 | Tran | G06F 9/324 | 718/107 |
| 9,389,869 B2* | 7/2016 | Tran | G06F 9/3854 | |
| 11,231,932 B2* | 1/2022 | Bolbenes | G06F 9/38585 | |
| 12,327,123 B2* | 6/2025 | Lowes | G06F 9/3844 | |
| 2002/0188833 A1* | 12/2002 | Henry | G06F 9/30054 | 712/E9.06 |
| 2002/0188834 A1* | 12/2002 | McDonald | G06F 9/3844 | 712/238 |
| 2002/0194460 A1* | 12/2002 | Henry | G06F 9/323 | 712/E9.06 |
| 2002/0194461 A1* | 12/2002 | Henry | G06F 9/30054 | 712/E9.06 |
| 2002/0194462 A1* | 12/2002 | Henry | G06F 9/3017 | 712/238 |
| 2002/0194463 A1* | 12/2002 | Henry | G06F 9/323 | 712/E9.057 |
| 2002/0194464 A1* | 12/2002 | Henry | G06F 9/3848 | 712/E9.05 |
| 2003/0120906 A1* | 6/2003 | Jourdan | G06F 9/323 | 712/228 |
| 2004/0143727 A1* | 7/2004 | McDonald | G06F 9/323 | 712/228 |
| 2005/0114636 A1* | 5/2005 | McDonald | G06F 9/3844 | 712/238 |
| 2005/0132175 A1* | 6/2005 | Henry | G06F 9/30149 | 712/E9.057 |
| 2006/0095745 A1* | 5/2006 | Tran | G06F 9/3826 | 712/E9.046 |
| 2006/0095750 A1* | 5/2006 | Nye | G06F 9/3848 | 712/240 |
| 2006/0149948 A1* | 7/2006 | Yokoi | G06F 9/323 | 712/E9.057 |
| 2007/0061555 A1* | 3/2007 | St. Clair | G06F 9/30054 | 712/E9.083 |
| 2007/0204137 A1* | 8/2007 | Tran | G06F 9/30189 | 712/E9.035 |
| 2008/0301420 A1* | 12/2008 | Inoue | G06F 9/3806 | 712/240 |
| 2010/0228950 A1* | 9/2010 | Henry | G06F 9/30054 | 712/205 |
| 2010/0228952 A1* | 9/2010 | Bean | G06F 9/3844 | 712/205 |
| 2011/0099355 A1* | 4/2011 | Tran | G06F 9/3836 | 712/217 |
| 2011/0099393 A1* | 4/2011 | Tran | G06F 9/3836 | 713/300 |
| 2014/0331028 A1* | 11/2014 | Demongeot | G06F 9/30054 | 712/205 |
| 2020/0285476 A1* | 9/2020 | Bolbenes | G06F 9/38585 | |
| 2022/0405102 A1* | 12/2022 | Lowes | G06F 9/3848 | |

OTHER PUBLICATIONS

'Daughter Board: What is It, Types, Benifits, Installation' by Aidan Taylor, Aug. 3, 2023. (Year: 2023).*

'Improving Prediction for Procedure Returns with Return-Address-Stack Repair Mechanisms' by Kevin Skadron et al., copyright 1998, IEEE. (Year: 1998).*

Machine Translation of Chinese Patent Application CN 121166207 A, published 2025. (Year: 2025).*

Machine Translation of Chinese Patent Application CN 117539543 A, published 2024. (Year: 2024).*

* cited by examiner

102 — calling branch instruction predicted to occur

104 — predict branch outcome and/or target address of calling branch

106 — If branch predicted taken, push speculative return address onto speculative CRS

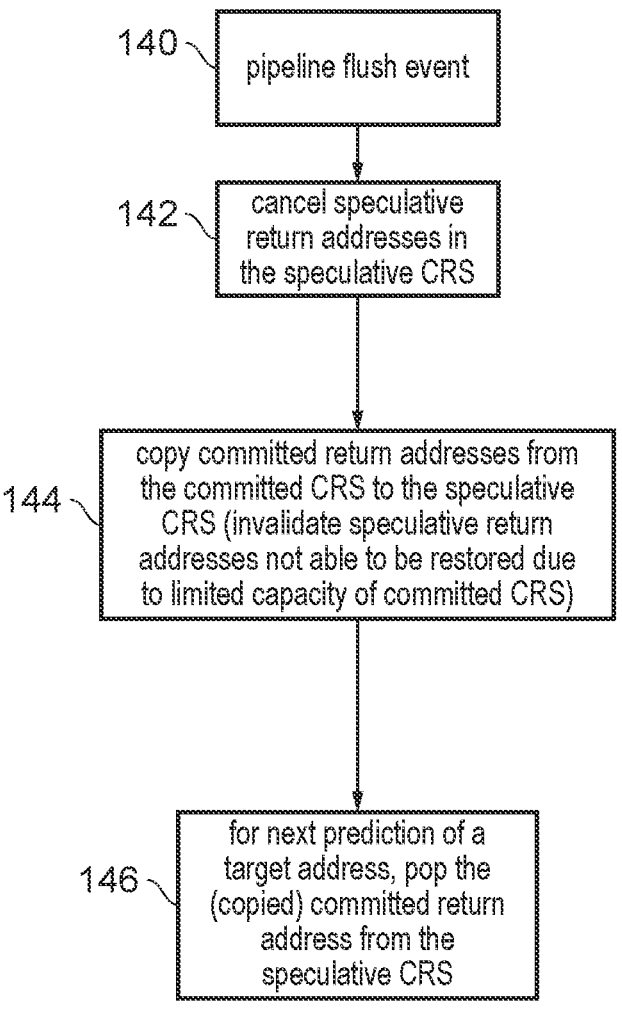

140 — pipeline flush event

142 — cancel speculative return addresses in the speculative CRS

144 — copy committed return addresses from the committed CRS to the speculative CRS (invalidate speculative return addresses not able to be restored due to limited capacity of committed CRS)

146 — for next prediction of a target address, pop the (copied) committed return address from the speculative CRS

FIG. 6

160 — push speculative return address onto speculative CRS

162 — set the cancellation indicator of the speculative return address to the cancellation state 164 — calling branch which pushed speculative return address guaranteed to be committed?    N

Y

168 — Set the cancellation indicator for the speculative return address to the non-cancellation state 210 — push speculative
return address
onto the
speculative CRS 212 — set the source-control
indicator of the speculative
return address to the
speculation state no has a pipeline
flush event
occurred?  — 214 yes

216 — update the source-control
indicator of a still-speculative
subset of the speculative
return addresses to the flush
state

RETURN ADDRESS RESTORATION

BACKGROUND

Technical Field

The present technique relates to the field of data processing and in particular to the management of call return stack structures.

Technical Background

When a data processing apparatus is performing a computer program, the program flow may include branches from one section of code to another section, before resuming the program flow in the first section. These may be caused by calling a subroutine or a function included in the computer program. A subroutine or function usually terminates with a return branch, which returns program flow back to the instruction after the calling branch which called the subroutine/function. The target address of the return branch is referred to as a return address.

SUMMARY

At least some examples of the present technique provide an apparatus comprising: speculative return address tracking circuitry to maintain a speculative call return stack structure to track speculative return addresses predicted based on speculative program flow; branch prediction circuitry to predict a target address of a return branch instruction based on the speculative call return stack structure; committed return address tracking circuitry to maintain a committed call return stack structure to track committed return addresses detected based on committed program flow for instructions executed by processing circuitry; and return address restoration circuitry responsive to a pipeline flush event to perform return address restoration based on one or more committed return addresses from the committed call return stack structure to prevent the branch prediction circuitry using one or more cancelled speculative return addresses of the speculative call return stack structure for predicting the target address of the return branch instruction; wherein the committed call return stack structure has a smaller capacity for storing return addresses than the speculative call return stack structure.

At least some examples of the present technique provide a system comprising: an apparatus as described above implemented in at least one packaged chip; at least one system component; and a board, wherein the at least one packaged chip and the at least one system component are assembled on the board.

At least some examples of the present technique provide a chip-containing product comprising the system described above, assembled on a further board with at least one other product component.

At least some examples of the present technique provide a method comprising: maintaining a speculative call return stack structure to track speculative return addresses predicted based on speculative program flow; predicting a target address of a return branch instruction based on the speculative call return stack structure; maintaining a committed call return stack structure to track committed return addresses detected based on committed program flow; in response to a pipeline flush event, performing return address restoration based on one or more committed return addresses from the committed call return stack structure and preventing use of one or more cancelled speculative return addresses of the speculative call return stack structure for predicting the target address of the return branch instruction; wherein the committed call return stack structure has a smaller capacity for storing return addresses than the speculative call return stack structure.

At least some examples of the present technique provide a non-transitory computer-readable medium to store computer-readable code for fabrication of an apparatus comprising: speculative return address tracking circuitry to maintain a speculative call return stack structure to track speculative return addresses predicted based on speculative program flow; branch prediction circuitry to predict a target address of a return branch instruction based on the speculative call return stack structure; committed return address tracking circuitry to maintain a committed call return stack structure to track committed return addresses detected based on committed program flow for instructions executed by processing circuitry; and return address restoration circuitry responsive to a pipeline flush event to perform return address restoration based on one or more committed return addresses from the committed call return stack structure to prevent the branch prediction circuitry using one or more cancelled speculative return addresses of the speculative call return stack structure for predicting the target address of the return branch instruction; wherein the committed call return stack structure has a smaller capacity for storing return addresses than the speculative call return stack structure.

Further aspects, features and advantages of the present technique will be apparent from the following description of examples, which is to be read in conjunction with the accompanying drawings.

BRIEF DESCRIPTION OF THE DRAWINGS

FIG. 6 illustrates an example of steps for restoration of the speculative call return stack structure in response to a pipeline flush event;

DESCRIPTION OF EXAMPLES

Figure 1:
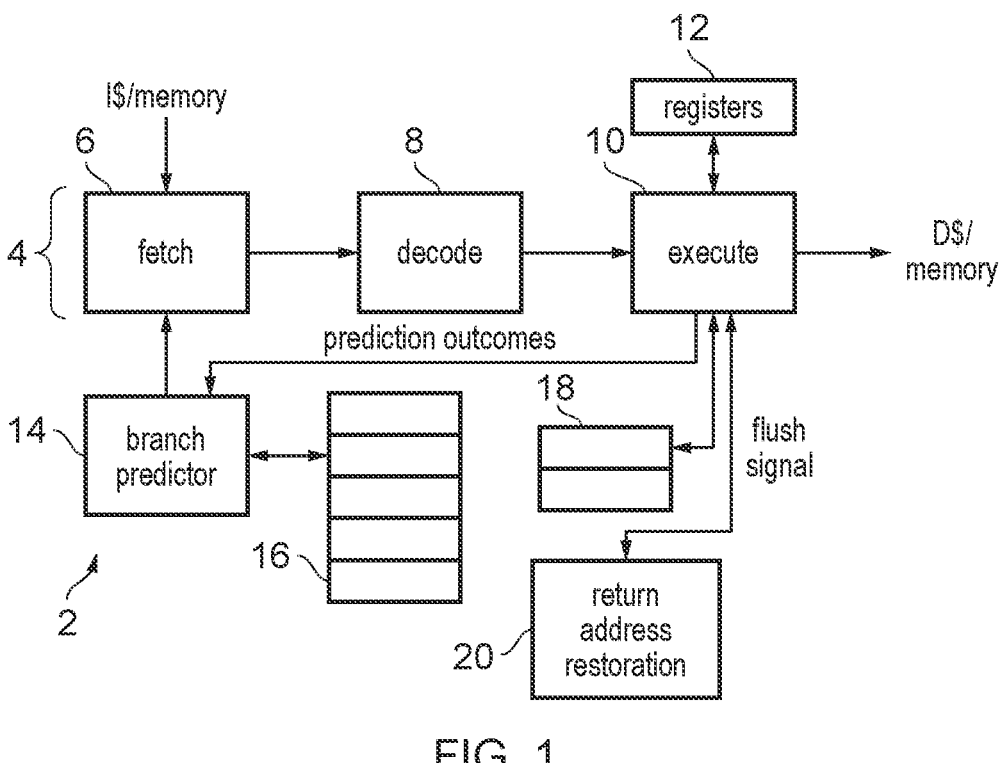
FIG. 1 illustrates an example of an apparatus comprising branch prediction circuitry.

Target addresses of return branch instructions can be challenging to predict for branch predictions using the target address prediction mechanisms used for other non-return branch instructions, because the same function may be called from many different locations in the code, and so the return address of a given return branch instruction can vary from one instance of that return branch instruction to another, depending on the location from which the corresponding function was called. To help predict target addresses of return branch instructions, speculative return address tracking circuitry may maintain a speculative call return stack structure (speculative CRS) to track speculative return addresses predicted based on speculative program flow. Branch prediction circuitry may predict a target address of a return branch instruction based on the speculative call return stack structure.

In accordance with some example embodiments, there is provided an apparatus comprising a speculative call return stack structure ("CRS") and a committed CRS. The speculative CRS and committed CRS are maintained based on speculative program flow and committed program flow respectively. Both CRSs are used to record expected return addresses for use as a target address of a return branch instruction, for example at the end of a subroutine.

The speculative program flow is formed based on predictions by branch prediction circuitry and, when those predictions are accurate, the speculative program flow should match the committed program flow defined by the program instructions that are actually executed and committed.

However, if the speculative program flow is not accurate, such as if a branch instruction was mispredicted, a pipeline flush event may be triggered to remove any incorrectly processed speculative instructions from a pipeline. On such pipeline flush events, one or more speculative return addresses recorded in the speculative CRS may also be incorrect. If the only incorrect predictions concern speculative pushes of return addresses to the speculative CRS, this could be fixed by restoring a stack pointer (which indicates the entry of the speculative CRS representing the "top" of the stack) to a previous value. However, pointer restoration may not be able to deal with corruption of the speculative CRS caused by incorrect predictions of a speculative pop followed by a speculative push on the speculative CRS.

An approach for improving branch prediction accuracy can be to also provide a committed call return stack structure (committed CRS) that is maintained by committed return address tracking circuitry based on committed program flow. Return address restoration circuitry may be responsive to a pipeline flush event to perform return address restoration based on one or more committed return addresses from the committed call return stack structure to prevent the branch prediction circuitry using one or more cancelled speculative return addresses of the speculative call return stack structure for predicting the target address of the return branch instruction. The return address restoration can help to improve branch prediction success rates by enabling some information learnt from committed program flow to be used to restore entries on the speculative CRS which were corrupted due to misprediction (e.g. this can help address corruption of the speculative CRS caused by incorrect speculative pops from the speculative CRS).

When a committed CRS is provided, one approach is to rely on the committed CRS being of sufficient size (e.g. equal to or greater than the size of the speculative CRS) so that the full depth of the speculative CRS can be restored based on the committed CRS. However, the inventors recognised that providing a full-sized committed CRS costs increased circuit area and power usage. In practice, each additional committed CRS entry has diminishing returns in terms of the performance improvement provided in improving branch prediction accuracy rates, as some restoration events occur when the committed function calls have only reached a shorter call depth and so have only made use of a subset of the committed CRS entries.

Counter-intuitively, the inventors recognised that it is sufficient to provide a committed CRS with smaller capacity for storing return addresses than the speculative CRS. This is surprising as one would think reducing the size of the committed CRS to less than the size of the speculative CRS would risk leaving some corrupted entries on the speculative CRS which could not be restored following a pipeline flush event. However, in practice, the inventors recognised that much of the performance benefit can come from the first few entries on a committed CRS, with successively less performance benefit arising from each additional committed CRS entry. Therefore, by providing a smaller committed CRS than speculative CRS, a better balance can be achieved between processing performance and the required circuit area and power usage associated with the committed CRS.

The committed return addresses that are pushed to the committed CRS may be useful for making further predictions after the pipeline flush event. Accordingly, some examples of the return address restoration may include causing the branch prediction circuitry to use the one or more committed return addresses from the committed CRS in place of a corresponding speculative return address of the speculative CRS for predicting the target address of the return branch instruction. As noted below, there can be different ways of implementing that a given committed return address from the committed CRS is used in place of a corresponding speculative return address.

Additionally, since the return address restoration circuitry prevents the branch prediction circuitry from using cancelled speculative return addresses, any other return addresses that are not cancelled may be retained in the speculative CRS. For example, return addresses that are lower down in the speculative CRS (i.e. addresses pushed to the speculative CRS less recently than the cancelled return addresses) may be known to have been committed and hence it can be advantageous to retain them in the event of a pipeline flush event. The branch prediction circuitry is not prevented from using the retained speculative return addresses of the speculative CRS for predicting a target address of a further return branch instruction.

Due to the more limited capacity of the committed CRS, in some examples the number of cancelled speculative return addresses may be larger than the number of committed return addresses available on the committed CRS. Accordingly, it is possible that one or more of the cancelled speculative return addresses are not able to be restored based on a corresponding committed return address from the committed CRS. In such cases, the return address restoration circuitry may invalidate those cancelled speculative return addresses in the speculative CRS. In response to determining that a current entry of the speculative CRS to be used for predicting the target address of the return branch instruction is invalidated (e.g. the current entry may be an entry popped from the speculative CRS from a location determined based on a current value of a stack pointer at the time of making the branch prediction), the branch prediction circuitry may generate a default prediction for the target address of the return branch instruction. This prevents addresses likely to be incorrect being used to make branch predictions.

In some examples, the default prediction is no prediction at all. In an implementation, where fetch circuitry subsequently uses the predictions made by the branch prediction circuitry to determine from where in memory to fetch new instructions, a lack of a prediction may cause the fetch circuitry to stall, preventing any instructions from being fetched until after the actual outcome has been resolved for the branch instruction for which no prediction is made. Hence, by making no prediction (and stalling subsequent instruction fetching) when a current entry of the speculative CRS was previously invalidated due to a pipeline flush event when it was not possible to restore that entry based on the committed CRS due to insufficient depth of the committed CRS being available, power consumption can be reduced because stalling the fetching of instructions avoids incurring a wasted power cost of pipeline actions (e.g. fetching/ decoding) relating to instructions that are unlikely to be correct.

A possible mechanism for ensuring that cancelled entries of the speculative CRS are not used for predictions made subsequent to the return address restoration includes copying one or more of the committed return address from the committed CRS to the speculative CRS. Accordingly, the speculative CRS may contain a combination of committed return addresses from the committed CRS and retained speculative return addresses that were not cancelled after the flush. This approach reduces the complexity of the read path compared to examples where the branch prediction circuitry is required to read from both the speculative CRS and the committed CRS, which may require at least an additional multiplexer incurring a timing cost penalty. A simpler read path can result in faster read times and hence reduces pressure in meeting circuit timings when designing the apparatus.

It is possible for the pipeline flush event to be caused by the calling branch instruction being mispredicted, for example if a subroutine or function was speculatively called incorrectly (due to the calling branch instruction being incorrectly predicted taken), or if the target address of the calling branch instruction was mispredicted. If a calling branch instruction is determined mispredicted, one or more speculative return address that were pushed to the speculative CRS may be incorrect and can be cancelled as described above, and the committed CRS can be used to restore state to the speculative CRS by copying across return addresses.

Normally, one would expect that, for a pipeline flush event caused by a branch misprediction, the return address restoration would be based on any committed return addresses obtained from the committed CRS.

However, the inventors recognised that in the particular case of at least one class of misprediction being detected for a calling branch instruction, the return address restoration circuitry may write an additional return address associated with the mispredicted calling branch instruction to the speculative CRS. The additional return address can be separate from any committed return addresses restored based on the committed CRS. hence, that additional return address may be written to the speculative CRS in addition to one or more committed return addresses copied from the committed CRS into the speculative CRS (the additional return address being at the top of the updated speculative CRS following the return address restoration, and the one or more copied return addresses obtained from the committed CRS being at positions lower down the speculative CRS following the call return address). This recognises that, on a mispredicted calling branch instruction, the correct return address to be specified for a return branch corresponding to that calling branch instruction can be derived from the address of the mispredicted calling branch instruction itself, and then up to N entries of the committed CRS corresponding to return addresses for the previous N function calls in a nested set of function calls can be obtained from the committed CRS corresponding to previously committed calling branch instructions. Hence, with this approach of copying an additional return branch instruction, a committed CRS with a capacity for N entries can actually be used, in conjunction with the additional return address obtained for the mispredicted calling branch instruction, to restore up to N+1 entries of the speculative CRS. Hence, this can help mitigate the restriction on the ability to restore return addresses imposed by the limited capacity of the committed CRS being smaller than the speculative CRS.

The additional return address may correspond to the address of the next sequential instruction after the calling branch instruction that was mispredicted. For example, if the mispredicted calling branch instruction is address X, the additional return address may be address X+O, where O is the offset between addresses of neighbouring instructions stored in memory. For example, O may correspond to 4 if all instructions have a 32-bit encoding.

The at least one class of misprediction (for which a pipeline flush event triggers pushing the additional return address to the speculative CRS) for the calling branch instruction may comprise misprediction of the target address of the calling branch instruction. The at least one class of misprediction could also include misprediction of the calling branch instruction as not-taken when it should actually have been taken. It is not necessary for all types of misprediction to trigger pushing the additional return address to the speculative CRS. For example, if the calling branch instruction is mispredicted as taken when it should actually have been not-taken, then there is no need to copy return addresses to the speculative CRS at all, as pointer restoration can deal with the incorrect speculative push of return addresses to the speculative CRS caused by the incorrectly taken calling branch. Hence, incorrect taken predictions of a calling branch instruction may not be considered one of the at least one class of misprediction for a calling branch instruction that would cause the additional return address to be written to the speculative CRS.

When copying the committed return addresses from the committed CRS as part of the return address restoration, the return address restoration circuitry may overwrite at least one of the one or more cancelled speculative return addresses in the speculative CRS. This enables the speculative CRS to make better use of the available capacity since the cancelled return addresses are prevented from being used for any predictions by the branch prediction circuitry. However, it is recognised that due to the more limited capacity in the committed CRS, there may not be a sufficient number of committed return addresses to overwrite every one of the cancelled return addresses. Accordingly, the return address restoration circuitry invalidates any cancelled speculative return addresses that are not overwritten. As described above, the branch prediction circuitry may then generate a default prediction when popping an invalidated return address from the speculative CRS.

During return address restoration, some implementations might simply copy return addresses from all available committed CRS entries to corresponding entries of the speculative CRS. However, sometimes, such as where the workload being executed has relatively long regions of code within a subroutine that do not call a further subroutine, by the time a given calling branch instruction is committed, the number of further speculative return addresses which have been pushed to the speculative CRS after a return address pushed for the given calling branch instruction may be relatively low (in comparison to other workloads with nested subroutine calls with much shorter stretches of code that does not call any further subroutine from within another subroutine). Hence, sometimes, at the point of restoring return addresses on the speculative CRS following a pipeline flush, the speculative CRS may also have a number of entries which hold return addresses pushed to the speculative CRS corresponding to already-committed calling branches. Although for a simpler implementation, those entries could nevertheless be restored based on copying return addresses from the committed CRS (even if the copied committed return addresses are identical to the speculative return addresses already present in the speculative CRS), this can waste power.

Therefore, some examples of the present technique implement a cancellation indicator associated with each speculative return address in the speculative CRS. The cancellation indicator (which could in some examples be implemented as a single bit, but could also be a multi-bit indicator) provides at least two states: a cancellation state and a non-cancellation state. These states are used to control whether the speculative return address associated with the indicator is to be cancelled or not in response to the pipeline flush event. Accordingly, some speculative return addresses may not be cancelled and hence not overwritten by a corresponding (identical) committed return address from the committed CRS. This helps save power by reducing the number of times a write operation is performed on an entry of the speculative CRS which would not result in any change to the stored value in that entry.

When the speculative return address tracking circuitry writes or pushes a new speculative return address onto the speculative CRS, the associated cancellation indicator is set to the cancellation state. This is because it is not yet known whether the prediction of a calling branch instruction, on which that speculative return address is based, was correct or not. After a period of time, it will eventually be known whether predicting the calling branch instruction was correct and is guaranteed to have been committed. At this point, it is known that it is beneficial to retain that speculative return address, and the speculative return address tracking circuitry updates the cancellation indicator from the cancellation state to the non-cancellation state.

There can be a variety of ways in which the speculative return address tracking circuitry could detect that a calling branch instruction associated with setting a given speculative return address on the speculative CRS is guaranteed to have been committed.

In some examples, to detect whether the calling branch instruction associated with setting of the speculative return address is guaranteed to have been committed, the speculative return address tracking circuitry may detect whether there are any in-flight calling branch instructions. An in-flight calling branch instruction may be a calling branch instruction that has been detected as present but has not yet committed or retired. Hence, once there are no remaining in-flight calling branch instructions, all entries of the speculative CRS having the cancellation indicator in the cancellation state can have the cancellation indicator switched to the non-cancellation state. This form of detection by the speculative return address tracking circuitry is less precise, since it may mean a speculative return address has a cancellation indicator in the cancellation state due to at least one in-flight calling branch instruction remaining, even though the calling branch instruction for which the speculative return address was pushed to the speculative CRS has actually committed. However, this form of detection is easier to implement because it is not necessary to track specific calling branch instructions as they progress through the pipeline, so can reduce power consumption and circuit area as well as simplifying design overhead in designing a circuit that meets timing requirements.

However, other examples may track commitment of in-flight calling branch instructions more precisely, and use such tracking to determine when an individual entry of the speculative CRS can have its cancellation indicator switched from the cancellation state to the non-cancellation state. Hence, in response to detecting commitment of an oldest in-flight calling branch instruction, the speculative return address tracking circuitry may update the speculation indicator associated with an oldest speculative return address having the speculation indicator specifying the cancellation state, to set the speculation indicator for the oldest speculative return address to the non-cancellation state. This more precise tracking can reduce power consumption by reducing the likelihood that entries of the speculative CRS that actually are correct are unnecessarily overwritten during return address restoration.

One example of how the speculative return address tracking circuitry could determine whether an individual calling branch instruction is committed is to track in a speculative CRS pointer queue the speculative CRS pointer values corresponding to speculative CRS entries that were written speculatively, and when a calling instruction commits, the oldest entry in the queue can be popped and used to decide which entry can be marked as non-cancellation state.

Hence, it will be appreciated that there can be a wide variety of techniques for tracking when a given speculative return address in the speculative CRS can have its cancellation indicator updated to the non-cancellation state.

As a consequence of implementing a smaller committed CRS according to the present techniques, frequent pops from the committed CRS may result in the committed CRS being emptied, which may prevent the return address restoration being able to restore return addresses to the speculative CRS if a subsequent misprediction is detected. For example, if the committed CRS was empty, then there would be no committed return addresses to copy to the speculative CRS in response to the pipeline flush event. However, as noted above the speculative CRS can sometimes include some entries which relate to return addresses set by calling branches which have already committed. Accordingly, in some examples, the return address restoration circuitry may be configured to monitor the committed CRS to detect when it has a predetermined number of invalid or empty entries. If so, then the return address restoration circuitry may copy one or more of the speculative return addresses from the speculative CRS to the committed CRS. This can help mitigate against performance limitations caused by the reduced capacity of the committed CRS.

Another possible mechanism for the return address restoration includes controlling the source from which the branch prediction circuitry pops a return address. In some examples, each speculative return address in the speculative CRS is associated with a source-control indicator, for example a single bit, which provides at least two states: a speculation state and a flushed state. When the source-control indicator is in the speculation state, the branch prediction circuitry is able to use the speculative return address from that entry of the speculative CRS, and so reads or pops a current speculative return address from the current entry of the speculative CRS for predicting the target address of the return branch instruction. On the other hand, if the source-control indicator for a given speculative return address in the speculative CRS is in the flushed state, then the branch prediction circuitry is to treat those speculative return addresses as though they had been flushed. Accordingly, the branch prediction circuitry pops a corresponding committed return address from the committed CRS for predicting the return address of the return branch instruction instead. Even when obtaining the committed return address from the committed CRS, a stack pointer associated with the speculative CRS may also be updated in a similar way to the pointer update that would have been performed had the return address for the branch prediction been obtained from the speculative CRS itself.

When writing or pushing a speculative return address onto the speculative CRS, the associated source-control indicator is set to the speculation state. The speculative return address tracking circuitry is configured to update the source-control indicator for at least one speculative return address from the speculation state to the flushed state in response to the pipeline flush event (while one or more other speculative return addresses determined to be incorrect but which are not able to be restored due to insufficient capacity on the committed CRS may become invalid as mentioned earlier).

Specific examples will now be described with reference to the drawings.

FIG. 1 illustrates an example of a data processing apparatus 2. The apparatus 2 comprises a processing pipeline 4 for processing program instructions fetched from an instruction cache or from memory (not illustrated). The processing pipeline 4 comprises a fetch stage 6 for fetching the program instructions, which are then passed to a decode stage 8 to identify the type of instruction represented and to generate control signals for controlling downstream stages of the pipeline 4 to process the instructions according to the identified instruction types. The decode stage 8 passes the decoded instructions to an execute stage 10, which may include various functional units for performing the processing operations associated with respective types of instructions. For example, the execute stage 10 may include an arithmetic/logic unit (ALU) for performing arithmetic operations such as add or multiply and logical operations such as AND, OR, NOT, etc. Also the execute unit 10 may include a floating-point unit for performing operations involving floating-point numbers, a load/store unit for performing loading and storing data from/to a data cache or the memory (not illustrated). The execute stage 10 is coupled with registers 12 for storing operands used for processing an instruction.

It will be appreciated that the pipeline architecture shown in FIG. 1 is just one example, and other examples could have additional pipeline stages or a different arrangement of pipeline stages. For example, in an out-of-order processor a register rename stage may be provided for mapping architectural registers specified by program instructions to physical registers identifying the registers 12 provided in hardware. Also, it will be appreciated that FIG. 1 does not show all of the components of the data processing apparatus 2 and that other components could also be provided. For example, a memory management unit could be provided for controlling address translation between virtual addresses specified by the program instructions and physical addresses used by the memory system.

The data processing apparatus 2 is provided with a branch predictor 14 to predict the outcomes and target addresses of branch instructions. Based on these predictions, the branch predictor 14 controls the fetch stage 6 to fetch the subsequent instructions beyond the branch earlier than if waiting for the actual branch outcome to be resolved at the execute stage 10. The branch predictions may be based on previous outcomes of branch instructions resolved at the execute stage 10. For example, the branch predictor 14 may include one or more prediction state tables updated based on branch outcomes received from the execute stage 10.

Some branch instructions, referred to herein as calling branch instructions, are used to call a section of code, such as a subroutine. When a subroutine has been completed, a return branch instruction is executed to return program flow to an instruction at a return address subsequent to that of the calling branch instruction. Subroutines can be defined for code functionality which might be useful at multiple points on the program. The return address helps track the point of the program at which the current instance of the subroutine has been called, so that the program flow can return to the corresponding part of the program when the subroutine has completed.

Hence, when a calling branch is executed, the address of the next sequential instruction after the calling branch is written to a link register (one of the registers 12), for use as a return address when a subsequent return branch is executed. However, as the link register may only have capacity for a single return address, then if the code in a subroutine calls another subroutine (i.e. a nested subroutine), the software may have to manage saving the contents of the link register out to memory before executing another calling branch instruction which would cause the execute stage 10 to overwrite the link register when executing. Typically, the software maintains a stack data structure (structure having a last-in-first-out (LIFO) arrangement) in memory using load/store instructions.

Figure 2:
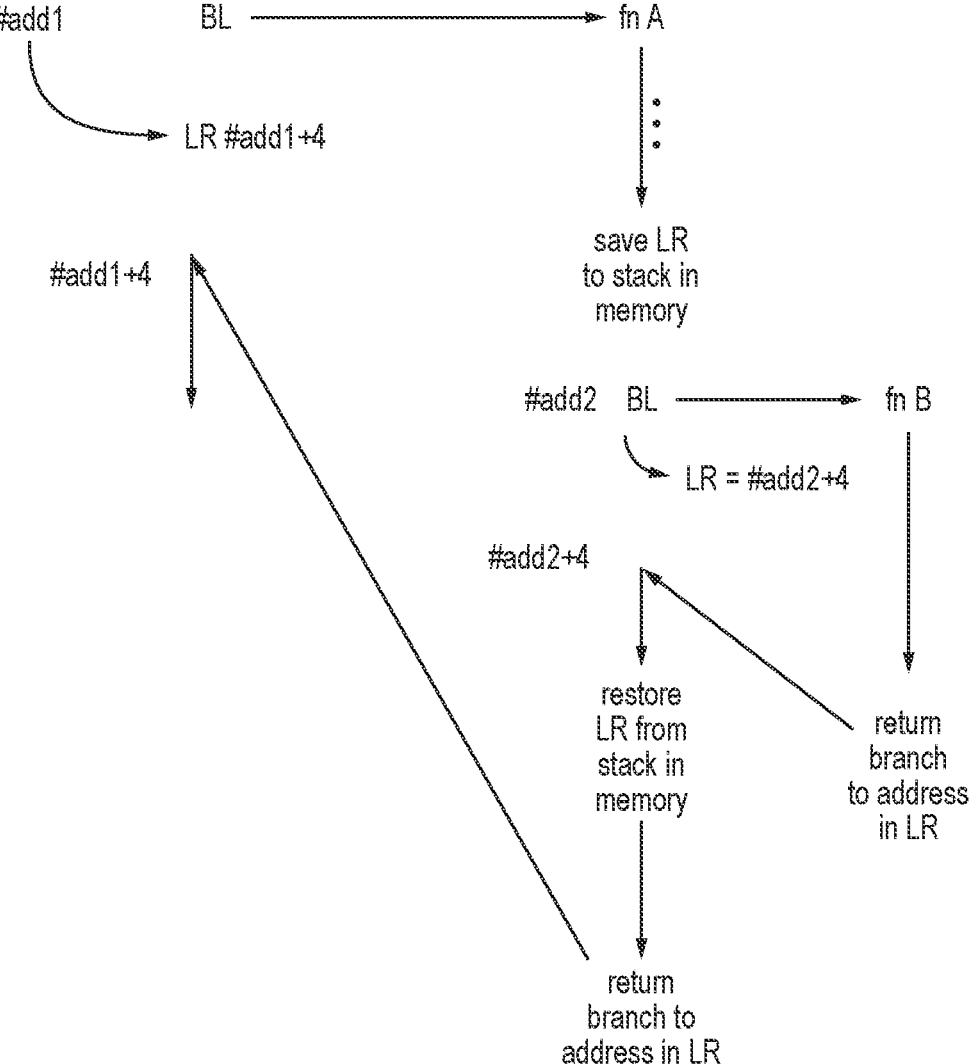
FIG. 2 illustrates an example of calling branch instructions and return branch instructions.

FIG. 2 illustrates an example of program flow containing multiple calling branch instructions. The flow begins at the instruction address "#add1" containing a branch-with-link instruction BL to call a subroutine fn A. In this example, BL corresponds to a calling branch instruction. The return address (i.e. the address of the next sequential instruction after BL) is written to the link register in response to the calling branch instruction BL. In this example, instructions comprise 32 bits, so the address of the next instruction is #add1+4 bytes. It will be appreciated that the interval between instruction addresses would depend on the number of bits used in the instructions. For example, in an instruction set with 64-bit instruction encodings, the return address could be #add1+8 bytes. The program flow then continues through fn A before encountering another BL instruction at the instruction address #add2 to call a subroutine fn B. Hence, as the BL instruction at #add2 would overwrite the link register, prior to executing the BL at #add2, the software includes a store instruction to save the contents of the link register (LR) (i.e. the return address #add1+4 corresponding to fn A) to a software-maintained stack in memory.

Subsequently, the BL instruction at #add is executed which causes the address (#add2+4) of the next sequential instruction to be written to the LR and the program flow to branch to the target address of that BL instruction, corresponding to the start of function fn B. At the end of fn B, a return branch instruction RET is encountered. The return branch obtains its target address from the LR, so when taken directs the program flow back to #add2+4. In other words, the section of code in fn A is resumed. Having returned to fn A, the software code within fn A includes a load instruction to pop the previously saved return address from the software-maintained stack in memory, and restore this address (#add1+4) to the LR. At the end of fn A, another RET instruction is encountered and this causes another return branch to a target address obtained from the LR, i.e. program flow now resumes from #add1+4, the instruction after the calling branch which originally called fnA.

To help predict target addresses of return branches associated with such call/return program flow, the branch predictor 14 (acting as speculative return address tracking circuitry in this example) maintains a speculative CRS 16 as shown in FIG. 1, which is maintained based on speculative return addresses based on speculative program flow (program flow predicted to be required, but which may not necessarily be correct, depending on the outcome of branch predictions made by the branch predictor 14). In particular, the speculative return addresses pushed to the speculative CRS 16 are return addresses determined for instructions predicted to be taken calling branches, such as the BL instructions at #add1 and #add2 in the example of FIG. 2.

Figure 3:
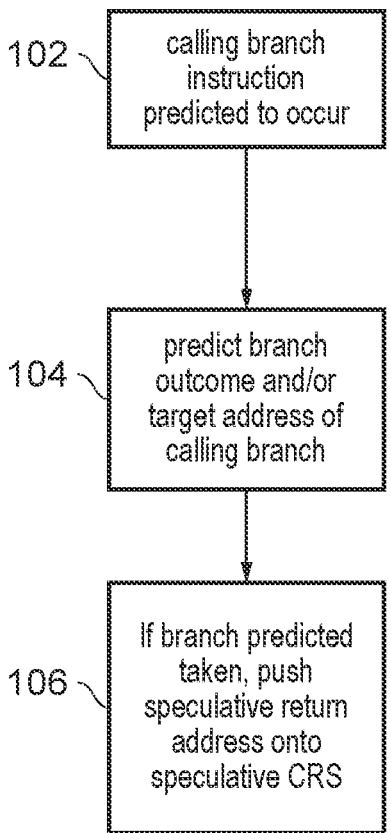
FIG. 3 illustrates an example of steps for maintaining a speculative call return stack structure.

FIG. 3 illustrates steps performed by the branch predictor 14 for maintaining the speculative CRS 16 based on the speculative program flow. At step 102, the branch predictor 14 predicts that a calling branch instruction will be encountered. For example, this could be based on detecting, based on a lookup to a branch target buffer (BTB) or other prediction structure, that a block of addresses at a current point of speculative program flow reached by the branch predictor has previously been observed as including a calling branch instruction.

At step 104, the branch predictor 14 generates a prediction of the outcome of the branch, such as "taken" or "not taken", and the target address of the branch. If the calling branch instruction is predicted to be taken, then at step 106 the branch predictor 14 pushes a speculative return address onto a speculative CRS 16 (a speculative stack pointer used to track the top of the speculative CRS is updated based on the push event). The speculative return address corresponds to the address of the next sequential instruction in the memory address space after the address of the predicted calling branch instruction (the next sequential instruction being the instruction that would be executed after the instruction at the address where the calling branch instruction is predicted to occur, if the calling branch instruction was not-taken).

In the example of FIGS. 1 and 3, the branch predictor 14 functions as speculative return address tracking circuitry for maintaining the speculative CRS 16. However, in other examples, at least part of the speculative return address tracking circuitry could be provided separate from the branch predictor 14. For example, the speculative return address tracking circuitry could be associated with the decode stage 8 and could push return addresses to the speculative CRS 16 based on calling branch instructions being detected among the decoded instructions. Such calling branch instructions may be considered speculative as they could occur in the shadow of an unresolved branch prediction.

Figure 4:
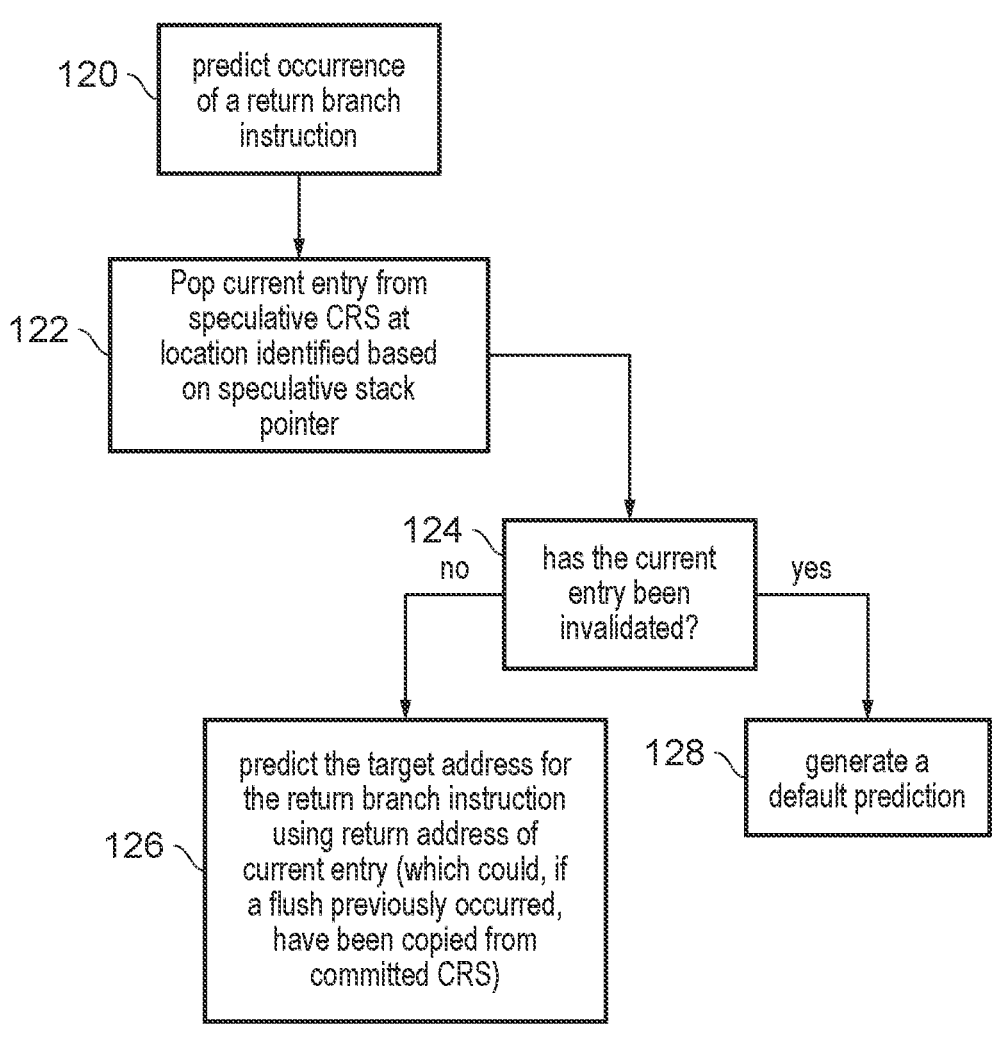
FIG. 4 illustrates an example of steps for generating a branch prediction based on the speculative call return stack structure.

The speculative return addresses on the speculative CRS 16 can be used to generate predicted target addresses for return branch instructions, as shown in FIG. 4. At step 120, the branch predictor 14 predicts that a return branch instruction will occur in the program being executed, at a given address reached in speculative program flow. This prediction can be based on a lookup to a BTB or other prediction structure that indicates that a given block of addresses at a current point of speculative program flow has previously been observed as including a return branch instruction. At step 122, in response to identifying the predicted occurrence of the return branch instruction when the branch is predicted or determined to be taken, the branch predictor 14 pops a current entry of the speculative CRS 16 (the current entry being identified based on the speculative stack pointer, and the speculative stack pointer then being updated to reflect that an entry is being popped from the stack). Assuming the current entry popped form the speculative CRS 16 has not been invalidated (step 124—see subsequent discussion of FIG. 6 below), at step 126 the target address for the return branch instruction is predicted as being the return address in the popped entry. When speculative program flow is correctly predicted, the sequence of speculative CRS pops should be in reverse order compared to the corresponding speculative CRS pushes and the return addresses of each return branch within a nested set of functions can be correctly predicted (provided the nesting depth does not exceed the capacity of the speculative CRS 16).

However, if some branches are mispredicted, the contents of the speculative CRS can become corrupted. To help restore the speculative CRS following a pipeline flush caused by branch misprediction, in addition to the speculative CRS 16 as maintained by the speculative return address tracking circuitry (e.g. the branch predictor 14), the execute stage 10 (acting as committed return address tracking circuitry in this example) is configured to maintain a committed CRS 18 based on the committed program flow. Accordingly, the execute stage 10 in some examples operates as the committed return address tracking circuitry defined in the appended claims. In other examples, circuitry other than the execute stage 10 could act as the committed return address tracking circuitry, with that circuitry making updates to the committed CRS based on information provided by the execute stage indicating events associated with committed program flow. Hence, the particular location of the committed return address tracking circuitry can vary depending on implementation choice.

The committed CRS 18 is maintained in a similar way to the speculative CRS 16, with a return address (corresponding to the address of a next sequential instruction after a calling branch instruction) being pushed to the committed CRS in response to execution of the calling branch instruction BL, and a return address being popped from the committed CRS 18 in response to execution of a return branch instruction RET. The committed CRS 18 also is managed according to a LIFO arrangement. However, as shown in FIG. 1, the committed CRS 18 is implemented with a smaller capacity for storing return addresses than the speculative CRS 16. Hereon, return addresses that are generated by the predicted address and pushed onto the speculative CRS 16 will be referred to as "speculative return addresses", whereas return addresses that are generated by the execute stage 10 and pushed onto the committed CRS 16 will be referred to as "committed return addresses".

Since it is possible for a misprediction to occur, recently pushed speculative return addresses may be incorrect. For example, a sequence of instructions may comprise a conditional branch instruction, which if taken directs the program flow to a calling branch instruction. If the conditional branch preceding the calling branch instruction is incorrectly predicted as taken, then the predicted occurrence of, or decoding of, the calling branch instruction may cause a speculative return address to be pushed onto the speculative CRS 16. Since the speculative return address was pushed based on a misprediction, the speculative CRS 16 will be corrupted as the calling branch should not have executed in this scenario.

In accordance with the present techniques, the data processing apparatus 2 is provided with return address restoration circuitry 20 to perform return address restoration in response to a pipeline flush event (e.g. triggered after the misprediction has been identified). In particular, the return address restoration circuitry 20 performs return address restoration based on one or more of the committed return address from the committed CRS 18 to prevent the branch predictor 14 from using any speculative return addresses that have been cancelled during the pipeline flush event. The branch predictor 14 instead may be caused to use a committed return address in place of a corresponding speculative return address for predicting the target address of the return branch instruction. By doing so, it is not necessary to completely flush the speculative CRS 16 in the event of a pipeline flush event. Some entries (corresponding to committed entries on the committed CRS 18) can be corrected based on the state from the committed CRS 18. Some other entries, such as those from earlier predictions that have since been resolved as correct, can be retained in the speculative CRS 16. To save power, the committed CRS 18 does not have the full depth of the speculative CRS 16, which although this may occasionally lead to some incorrect speculative entries on the speculative CRS 16 not being able to be restored on a flush event, helps provide a better balance between improved performance (by reducing misprediction rates) and conserving circuit area and power consumption.

Figure 5:
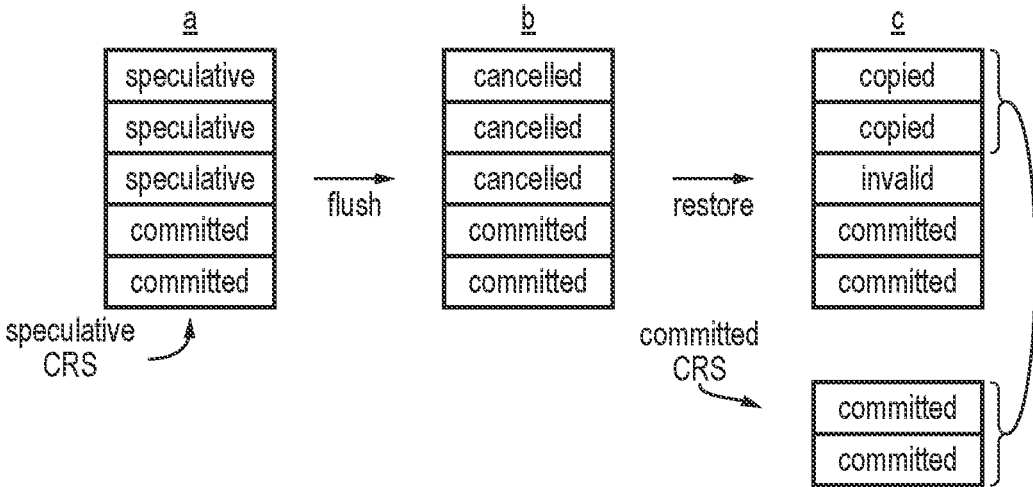
FIG. 5 illustrates restoration of the speculative call return stack structure based on a committed call return stack structure.

In some examples, the return address restoration circuitry 20 is configured to copy committed return addresses from the committed CRS 18 to the speculative CRS 16. FIG. 5 illustrates examples of states of the speculative CRS 16 before a pipeline flush event (state a), after a pipeline flush event (state b), and after the copy return address restoration has been performed (state c). In state a the speculative CRS 16 contains three return addresses which are speculative (i.e. the predictions which generated those return addresses have not yet been resolved). There are also two older return addresses which are committed (i.e. the calling instructions whose predicted occurrence caused those return addresses to be pushed to the speculative CRS have already been committed). After the pipeline flush event, since a prediction may have been found to be incorrect, the return addresses which are speculative are cancelled. The pipeline flush event also triggers the return address restoration circuitry 20 to copy the committed return addresses from the committed CRS 18 to the corresponding entries of the speculative CRS 16 in state c. Since there were three cancelled return addresses and only two committed return addresses capable of being copied, one of the cancelled return addresses could not be restored based on a committed return address from the committed CRS 18. In response, the return address restoration circuitry 20 invalidates that entry to prevent an incorrect prediction being made. Therefore, the speculative CRS now contains four entries which can be used for predicting a target address of a return branch instruction. While FIG. 5 shows states b and c as two separate states, in practice the cancellation and invalidation/copying of entries could be performed as a single step, so it may be that the speculative CRS never has the state show in state b.

Hence, FIG. 6 illustrates a method performed by the apparatus according to these techniques. At step 140, a pipeline flush event occurs, which causes speculative return addresses in the speculative CRS 16 to be cancelled at step 142. At step 144, one or more committed return addresses from the committed CRS 18 are copied to overwrite corresponding cancelled speculative return addresses in the speculative CRS 16. Due to limited capacity of the committed CRS 18 compared to the speculative CRS 16, it is possible that not all cancelled speculative return addresses can be restored by copying from corresponding entries of the committed CRS 18, and so any remaining cancelled speculative return addresses in the speculative CRS 16 are marked as invalid. Hence, when the next prediction of a target address of a return branch instruction occurs at step 146, the branch predictor 16 can pop a copied return address from the speculative CRS 16 (which has the value that was previously copied from the committed CRS).

Returning to the discussion of FIG. 4, hence step 124 checks, when popping a current entry of the speculative CRS for use in predicting a target address for a predicted occurrence of a return branch instruction, whether the popped entry was invalidated (the invalidation being a consequence of a previous pipeline flush which caused the entry to be detected as potentially incorrect but where it was not possible to restore that entry based on the committed CRS 18).

If the popped current entry is valid, the return address from that entry is used at step 126 to predict the target address for the return branch instruction. This valid popped entry could be a restored entry restored on a previous pipeline flush event (e.g. one of the copied entries shown in state c in FIG. 5), which was previously copied from the committed CRS 18.

If the popped current entry is determined to be invalid at step 124, then at step 128 of FIG. 4 a default prediction is generated for the return branch instruction. For example, the default prediction can be that no prediction is made for the target address of the return branch instruction. When no prediction is made by the branch predictor 14, the branch predictor 14 may stop the fetch stage 6 from fetching any more instructions beyond the location of the branch for which no prediction could be made. While this may cause a pipeline bubble when the execute stage 10 has no instructions to execute for some cycles, this may be preferable to predicting a target address based on the invalid entry which would be likely to cause a greater performance penalty in flushing instructions following a misprediction being detected. By not fetching for some cycles when the next instruction to be fetched is unlikely to be correctly predicted there is less wasted power in unnecessary activation of pipeline stages (e.g. instruction cache lookups, instruction decoding, etc.), so power consumption can be reduced.

Figure 7:
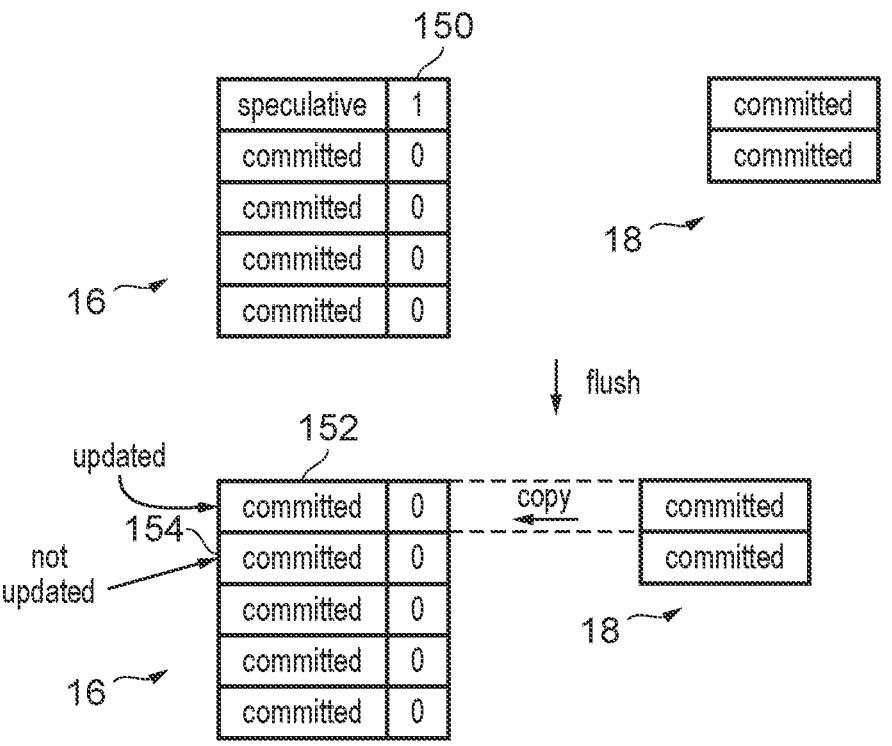
FIG. 7 illustrates cancellation indicators associated with speculative return addresses stored on the speculative call return stack structure.

FIG. 7 illustrates use of a cancellation indicator. Each entry of the speculative CRS 16 has an associated cancellation indicator 150 set to one of a cancellation state (in this example denoted by the cancellation indicator 150 having a value of 1) and a non-cancellation state (in this example, denoted by the cancellation indicator 150 having a value of 0). The cancellation indicator 150 for a given entry is set to the cancellation state when the entry is first pushed to the speculative CRS 16 in response to prediction of occurrence of a calling branch instruction, and is set to the non-cancellation state when that calling branch instruction is guaranteed to have committed. As shown in the lower part of FIG. 7, in response to a pipeline flush event, when restoring committed return addresses from the committed CRS 18, only entries of the speculative CRS 16 having the cancellation indicator set to the cancellation state (i.e. entry 152) are overwritten with a corresponding entry from the committed CRS 18. Entries of the speculative CRS 16 having the cancellation indicator set the non-cancellation state (i.e. entry 154) need not be overwritten even if they could be overwritten with a committed entry from the committed CRS 18. This reduces power consumption by saving the power consumed in overwriting a given entry of the speculative CRS 16 when the value copied to that entry from the committed CRS would be identical to the previous entry of the speculative CRS 16.

Figure 8:
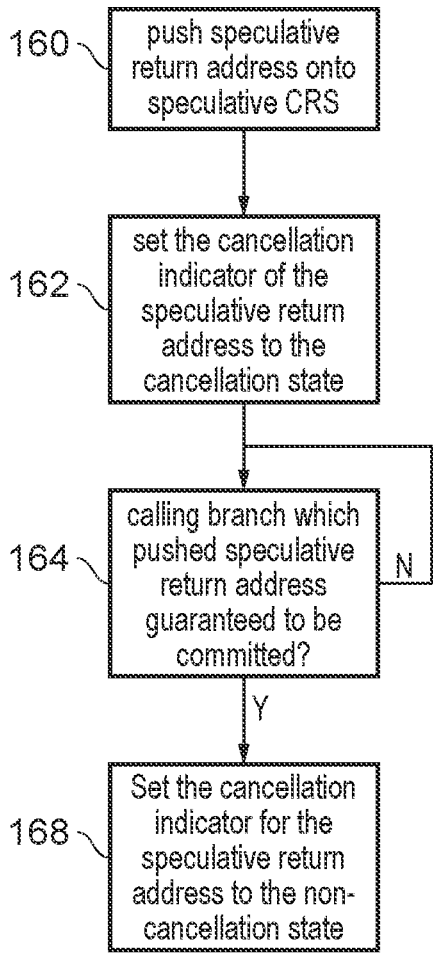
FIG. 8 illustrates an example of steps for updating a cancellation indicator associated with a given speculative return address.

FIG. 8 illustrates steps for maintaining the cancellation indicator 150. At step 160, speculative return address is pushed onto the speculative CRS 16. At step 162 the cancellation indicator 150 of the speculative return address is set the cancellation state. At step 164, the speculative return address tracking circuitry (e.g. the branch prediction circuitry 14) determines that the calling branch whose predicted occurrence caused the speculative return address to be pushed to the speculative CRS 16 is guaranteed to have committed, and if so, then at step 168 the cancellation indicator for the speculative return address is set to the non-cancellation state.

The detection at step 164 that the calling branch corresponding to a speculative return address is guaranteed to be committed could be performed in several ways as noted earlier, but in some examples the detection is based on the number of in-flight calling branch instructions. When it is detected that there are no calling branch instructions in flight, the cancellation indicator 150 for each entry of the speculative CRS 16 can be cleared to the non-cancellation state. Alternatively, a more precise mechanism of tracking which entries of the speculative CRS 16 correspond to committed calling branch instructions can be provided (e.g. based on a queue of speculative CRS pointer updates which may be used when a calling branch commits to identify the entry of the speculative CRS 16 that can have its cancellation indicator 150 cleared to the non-cancellation state).

Figure 9:
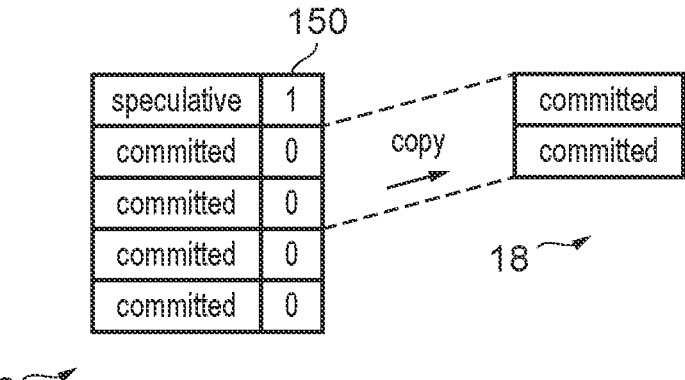
FIG. 9 illustrates copying of return addresses from the speculative call return stack structure to the committed call return stack structure.

FIG. 9 shows a concept of copying of return addresses to the committed CRS 18 from the speculative CRS 16. Sometimes, following several successive return branches being committed, the corresponding back to back pops may empty the committed CRS. This may risk not having state on the committed CRS capable of restoring corresponding entries on the speculative CRS 16 if a subsequent pipeline flush event is occurred.

However, at the point a pipeline flush event occurs, there may be older entries on the speculative CRS which correspond to already committed instructions. For example, the already committed return addresses could be identified as being the return addresses in the entries having the cancellation indicator 150 set to the non-cancellation state. At times when there are no in-flight calling instructions at all, all entries on the speculative CRS 16 may be considered already committed.

Hence, if there are committed entries on the speculative CRS 16, these could be copied to the committed CRS 18 as shown in FIG. 9, so that if subsequent speculative predictions of calling branches push further speculative return addresses onto the speculative CRS 16 (causing the older committed return addresses to be lost if the speculative CRS has become full), the retained committed entries on the committed CRS 18 could be used to restore some committed state back to the speculative CRS 16 if a subsequent misprediction occurs. The copying from the speculative CRS 16 to the committed CRS 18 can be done with reference to the committed stack pointer associated with the speculative CRS 16 and a stack pointer associated with the committed CRS 18, to ensure that copying from one stack 16 to the other 18 is aligned in terms of program flow. Hence, in some cases, as well as copying committed entries from the speculative CRS 16 to the committed CRS 18, one or more speculative or invalid entries of the speculative CRS 16 may also need to be copied to the committed CRS 18 to maintain correct ordering of the entries on the committed CRS 18.

Hence, the deeper capacity for the speculative CRS 16 can enable some extra protection for corruption to be provided for a given circuit area cost, by enabling entries of the speculative CRS 16 known to be correct to be copied to the committed CRS 18 when the committed CRS 18 becomes empty.

Figure 10:
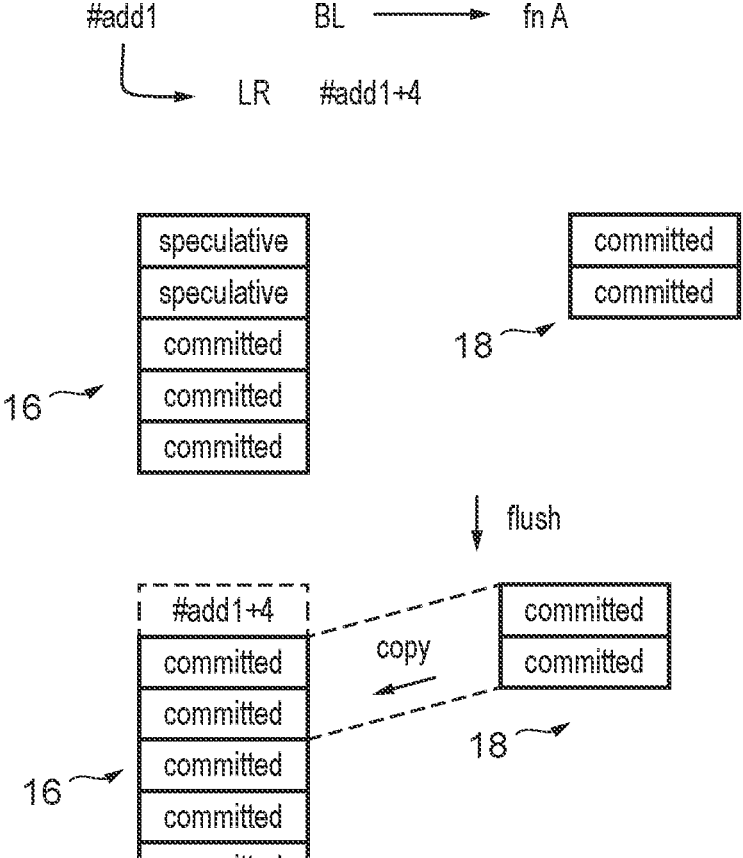
FIG. 10 illustrates writing an additional return address to the speculative call return stack structure, in addition to one or more committed return addresses from the committed call return stack structure.

FIG. 10 illustrates writing an additional return address to the speculative CRS 16 when performing return address restoration, in addition to copying committed return addresses from the committed CRS 18. FIG. 10 illustrates a flush event occurring due to one of a class of misprediction types being detected for a calling branch instruction BL. For example, the class of misprediction types can include misprediction of the target address of the calling branch instruction, and misprediction of the calling branch as not-taken when it should have been taken (the class of misprediction types can exclude a misprediction of the calling branch as taken when it should have been not-taken).

At the point when one of the class of misprediction types is detected for a calling branch instruction, the committed CRS 18 includes a number of valid entries representing return addresses pushed in response to commitment of previous calling branch instructions (seen earlier than the calling branch instruction that was mispredicted). One might think that only these committed return addresses on the committed CRS 18 should be copied to the speculative CRS 16. However, as shown in FIG. 10 an additional correct return address can be obtained based on the address #add1 of the mispredicted calling branch instruction BL, which would have written to the LR the return address #add1+4 (the address of the next sequential instruction after the calling branch). This return address #add1+4 represents a return address for an inner-nested function call, inside function calls that caused the return addresses currently stored on the committed CRS 18 to be pushed to the committed CRS 18.

Therefore, as shown in the lower part of FIG. 10, in addition to the entries being copied from the committed CRS 18 to the speculative CRS 16, the additional return address computed from the address of the mispredicted branch is also pushed to the speculative CRS 16 (with the additional return address being at the top of the stack following the resolution of the flush event, and the copied addresses from the committed CRS 18 being at the entries next on the stack after the entry having the additional return address). Hence, by writing the additional return address direct to the speculative CRS 16 and using the committed CRS 18 to restore subsequent entries to the speculative CRS 16 (rather than pushing the additional return address to the committed CRS 18 before performing the restoration from the updated committed CRS 18), greater capacity for restoration on the speculative CRS 16 is possible, as N+1 entries on the speculative CRS 16 can be restored even if the committed CRS 18 only comprises N entries.

In the example shown in FIGS. 5 to 10, return address restoration is performed by copying entries from the committed CRS 18 to the speculative CRS 16, overwriting the addresses in existing entries on the speculative CRS 16.

Figure 11:
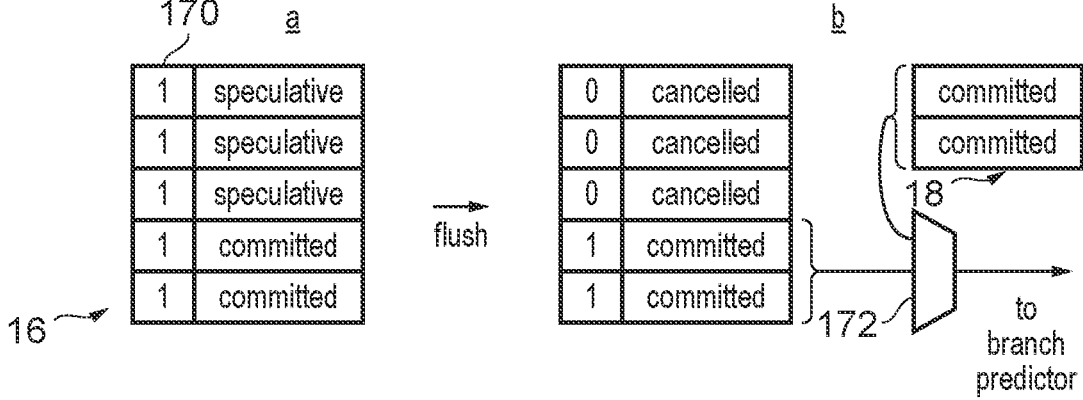
FIG. 11 illustrates an example using a source-control indicator to control whether branch predictions are made using an entry of the speculative call return stack structure or the committed call return stack structure.

However, as shown in FIG. 11, another way of ensuring that a return address is cancelled on the speculative CRS 16 can be to provide a source-control indicator 170 associated with each return address on the speculative CRS 16, indicating one of a speculation state and a flushed state for that return address. The source-control indicator 170 is set to the speculation state when a speculative return address is pushed to the speculative CRS 16 due to prediction of occurrence of a calling branch instruction, and is set to the flushed state in response to a pipeline flush event requiring that entry to be cancelled. The source-control indicator 170 for a given entry on the speculative CRS 16 is used by a multiplexer 172 to select whether, when that entry is popped for making a target address prediction for a predicted occurrence of a return branch instruction, whether to make the target address prediction based on the return address in the popped speculative CRS entry itself, or the return address in a corresponding entry on the committed CRS 18.

Figure 12:
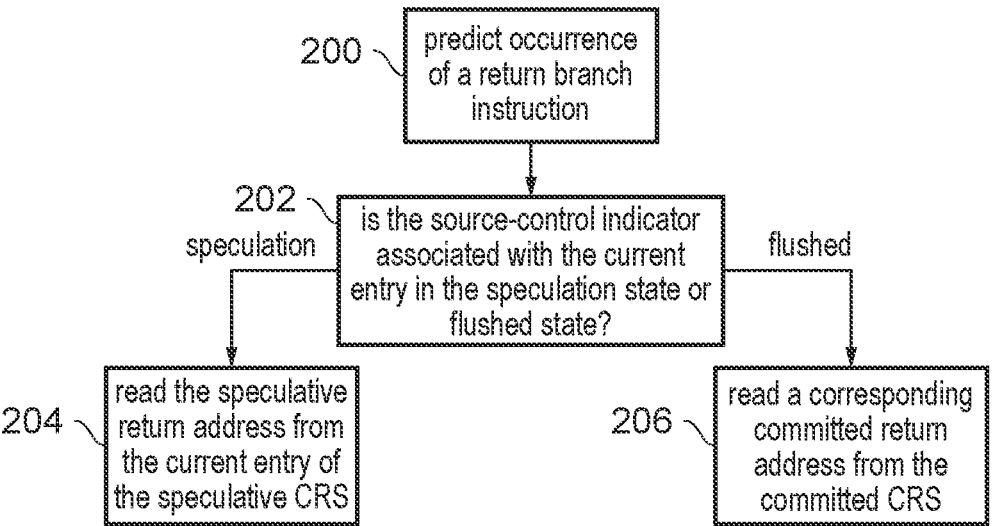
FIG. 12 illustrates an example of steps for generating a branch prediction based on the source-control indicator.

Hence, FIG. 12 shows a method of controlling target address prediction based on the source-control indicator 170. At step 200, the branch predictor 14 predicts occurrence of a return branch instruction. In response, at step 202, the current entry of the speculative CRS 16 is popped (e.g. from a location determined based on a speculative stack pointer) and the branch predictor 14 checks whether the source-control indicator 170 of that entry is in the speculation state or the flushed state. If the source-control indicator 170 is in the speculation state, then at step 204 the speculative return address is read from that popped current entry of the speculative CRS 16 and that speculative return address is used as the target address predicted for the return branch instruction. If the source-control indicator 170 is in the flushed state, then at step 206 the branch predictor 14 instead reads a corresponding committed return address from the committed CRS 18 and uses that committed return address as the predicted target address of the return branch.

Figure 13:
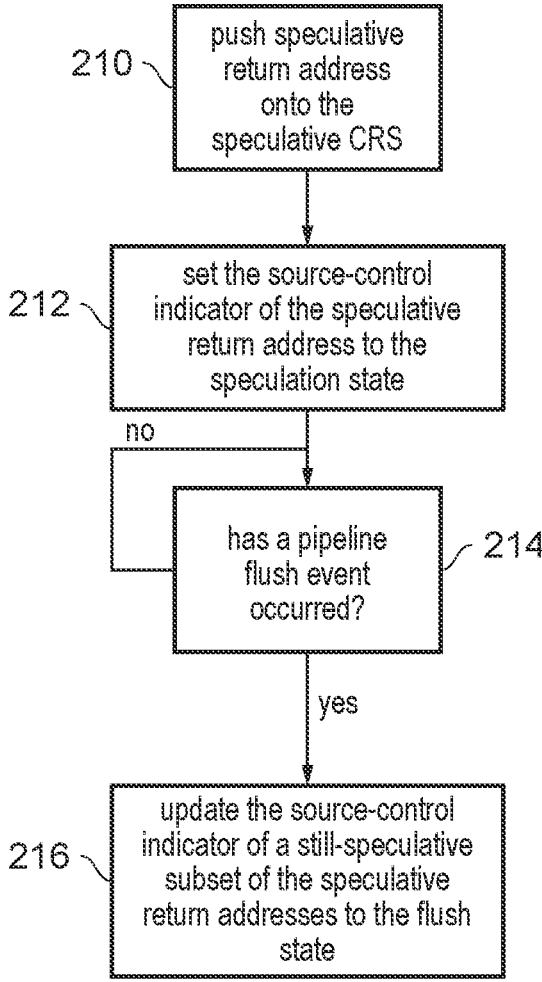
FIG. 13 illustrates an example of steps for updating the source-control indicator.
Figure 14:
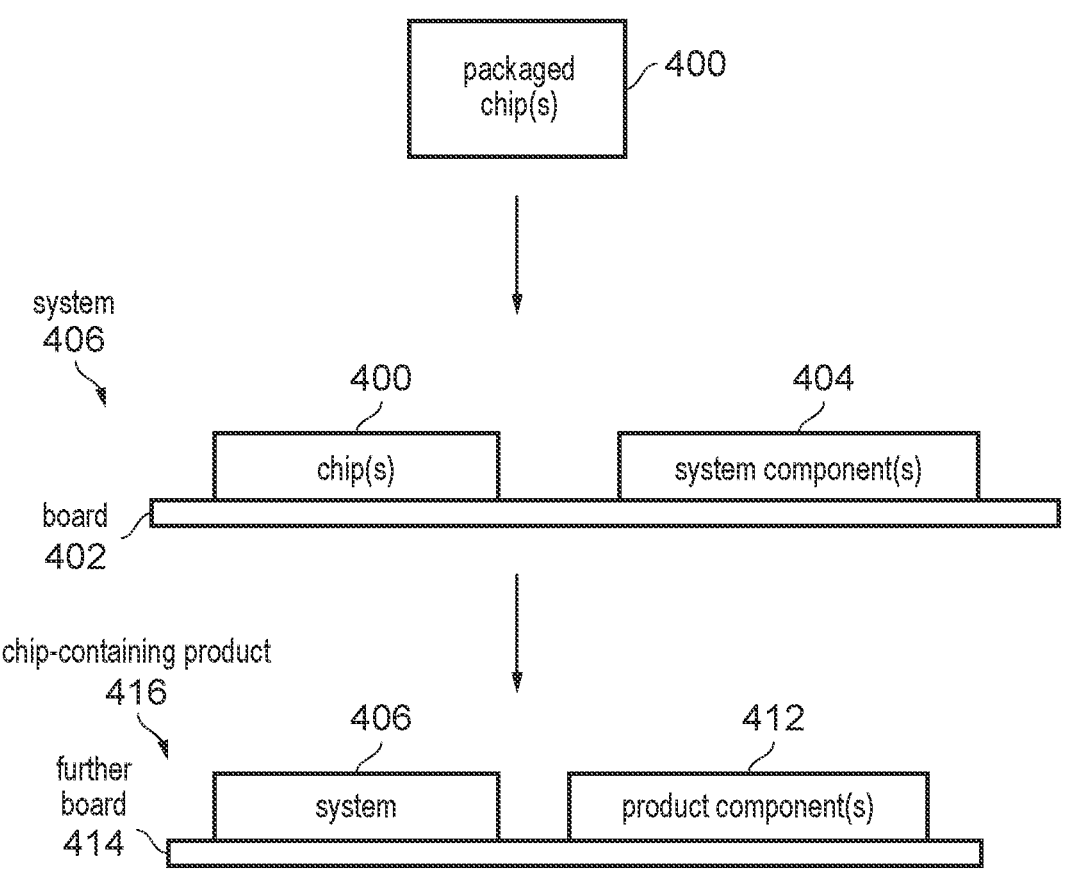
FIG. 14 illustrates a system and a chip-containing product.

FIG. 13 illustrates maintenance of the source-control indicator 170. At step 210, a speculative return address is pushed onto the speculative CRS 16 and in response at step 212 the source-control indicator 170 of that entry is set to the speculation state. At step 214, it is determined whether a pipeline flush event has occurred, and if so then at step 216 the source-control indicator 170 of a still-speculative subset of speculative return addresses (speculative return addresses pushed corresponding to predicted occurrences of calling branch instructions which are still to be committed) may be set to the flushed state. A maximum of N still-speculative return addresses may have their source-control indicator set to the flushed state, where N corresponds to the maximum capacity of the committed CRS. If there are more than N still-speculative return addresses then remaining still-speculative return addresses can be invalidated similar to the invalidation described at step 144 of FIG. 6, as there are not enough committed CRS entries to allow every flushed still-speculative entry of the speculative CRS to be replaced with a corresponding committed CRS entry.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

As shown in FIG. 13, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
   speculative return address tracking circuitry to maintain a speculative call return stack structure to track speculative return addresses predicted based on speculative program flow;
   branch prediction circuitry to predict a target address of a return branch instruction based on the speculative call return stack structure;
   committed return address tracking circuitry to maintain a committed call return stack structure to track committed return addresses detected based on committed program flow for instructions executed by processing circuitry; and
   return address restoration circuitry responsive to a pipeline flush event to perform return address restoration based on one or more committed return addresses from the committed call return stack structure to prevent the branch prediction circuitry using one or more cancelled speculative return addresses of the speculative call return stack structure for predicting the target address of the return branch instruction;
   wherein the committed call return stack structure has a smaller capacity for storing return addresses than the speculative call return stack structure.

2. The apparatus according to clause 1, wherein
   the return address restoration circuitry, when performing the return address restoration, is configured to cause the branch prediction circuitry to use one of the one or more committed return addresses from the committed call return stack in place of a corresponding speculative return address of the speculative call return stack structure for predicting the target address of the return branch instruction.

3. The apparatus according to clause 1 or clause 2, wherein
   the return address restoration circuitry, when performing the return address restoration, is configured to cause the speculative call return stack structure to retain one or more of the speculative return addresses; and
   the branch prediction circuitry is configured to use a retained speculative return address of the speculative call return stack structure for predicting a target address of a further return branch instruction.

4. The apparatus according to any preceding clause, wherein
   in response to the pipeline flush event, the return address restoration circuitry is configured to invalidate one or more of the cancelled speculative return addresses which are not able to be restored based on corresponding committed return addresses from the committed call return stack structure; and
   in response to determining that a current entry of the speculative call return stack structure to be used for predicting the target address of the return branch instruction is invalidated, the branch prediction circuitry is configured to generate a default prediction for the target address of the return branch instruction.

5. The apparatus according to clause 4, wherein
the default prediction is no prediction.

6. The apparatus according to any preceding clause, wherein
the return address restoration circuitry, when performing the return address restoration, is configured to copy the one or more committed return addresses from the committed call return stack to the speculative call return stack structure for use in a subsequent prediction of a return address of a return branch instruction.

7. The apparatus of clause 6, wherein
in response to the pipeline flush event being caused by at least one class of misprediction for a calling branch instruction, the return address restoration circuitry is configured to write an additional return address associated with the mispredicted calling branch instruction to the speculative call return stack structure.

8. The apparatus according to clause 6 or clause 7, wherein
the return address restoration circuitry, when performing the return address restoration, is configured to overwrite at least one of the one or more cancelled speculative return addresses with the one or more committed return addresses.

9. The apparatus according to clause 8, wherein
the return address restoration circuitry is configured to invalidate the one or more cancelled speculative return addresses that are not overwritten with the one or more committed return addresses.

10. The apparatus of any of clauses 6 to 9, wherein
the speculative return address tracking circuitry is configured to maintain the speculative call return stack structure such that a given speculative return address is associated with a cancellation indicator, wherein:
in a cancellation state, the cancellation indicator indicates that the given speculative return address is to be cancelled in response to the pipeline flush event; and
in a non-cancellation state, the cancellation indicator indicates that the given speculative return address is not to be cancelled in response to the pipeline flush event.

11. The apparatus of clause 10, wherein
the speculative return address tracking circuitry is configured to write the given speculative return address to the speculative call return stack structure with the speculation indicator in the cancellation state; and
the speculative return address tracking circuitry is configured to update the speculation indicator for the given speculative return address to the non-cancellation state in response to detecting that a calling branch instruction associated with setting of the given speculative return address is guaranteed to have been committed.

12. The apparatus according to clause 11, wherein the speculative return address tracking circuitry is configured to detect, in response to detecting that there are no longer any in-flight calling branch instructions, that the calling branch instruction associated with setting of the given speculative return address is guaranteed to have been committed.

13. The apparatus according to clause 11, wherein in response to detecting commitment of an oldest in-flight calling branch instruction, the speculative return address tracking circuitry is configured to update the speculation indicator associated with an oldest speculative return address having the speculation indicator specifying the cancellation state, to set the speculation indicator for the oldest speculative return address to the non-cancellation state.

14. The apparatus of any of clauses 10 to 13, wherein
the return address restoration circuitry is responsive to the committed call return stack structure having a predetermined number of invalid or empty entries to copy one or more speculative return addresses to the committed call return stack structure.

15. The apparatus of any of clauses 1 to 5, wherein
each entry of the speculative call return stack structure is associated with a source-control indicator having a speculation state or a flushed state, wherein:
in response to the source-control indicator associated with a current entry of the speculative call return stack structure having the speculation state, the branch prediction circuitry is configured to read a current speculative return address from the current entry of the speculative call return stack structure for predicting the target address of the return branch instruction; and
in response to the source-control indicator associated with the current entry having the flushed state, the branch prediction circuitry is configured to read a corresponding committed return address from the committed call return stack structure for predicting the target address of the return branch instruction.

16. The apparatus of clause 15, wherein
the speculative return address tracking circuitry is configured to write the given speculative return address to the speculative call return stack structure with the source-control indicator in the speculation state; and
the speculative return address tracking circuitry is configured to update the source-control indicator for at least one speculative return address to the flushed state in response to the pipeline flush event.

17. A system comprising:
the apparatus of any preceding clause, implemented in at least one packaged chip;
at least one system component; and
a board,
wherein the at least one packaged chip and the at least one system component are assembled on the board.

18. A chip-containing product comprising the system of clause 17 assembled on a further board with at least one other product component.

19. A method comprising:
maintaining a speculative call return stack structure to track speculative return addresses predicted based on speculative program flow;
predicting a target address of a return branch instruction based on the speculative call return stack structure;
maintaining a committed call return stack structure to track committed return addresses detected based on committed program flow;
in response to a pipeline flush event, performing return address restoration based on one or more committed return addresses from the committed call return stack structure and preventing use of one or more cancelled speculative return addresses of the speculative call return stack structure for predicting the target address of the return branch instruction;
wherein the committed call return stack structure has a smaller capacity for storing return addresses than the speculative call return stack structure.

20. A non-transitory computer-readable medium to store computer-readable code for fabrication of an apparatus comprising:

speculative return address tracking circuitry to maintain a speculative call return stack structure to track speculative return addresses predicted based on speculative program flow;

branch prediction circuitry to predict a target address of a return branch instruction based on the speculative call return stack structure;

committed return address tracking circuitry to maintain a committed call return stack structure to track committed return addresses detected based on committed program flow for instructions executed by processing circuitry; and return address restoration circuitry responsive to a pipeline flush event to perform return address restoration based on one or more committed return addresses from the committed call return stack structure to prevent the branch prediction circuitry using one or more cancelled speculative return addresses of the speculative call return stack structure for predicting the target address of the return branch instruction;

wherein the committed call return stack structure has a smaller capacity for storing return addresses than the speculative call return stack structure.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
speculative return address tracking circuitry configured to maintain a speculative call return stack structure to track speculative return addresses predicted based on speculative program flow;

branch prediction circuitry configured to predict a target address of a return branch instruction based on the speculative call return stack structure;

committed return address tracking circuitry configured to maintain a committed call return stack structure to track committed return addresses detected based on committed program flow for instructions executed by processing circuitry; and return address restoration circuitry responsive to a pipeline flush event to perform return address restoration based on one or more committed return addresses from the committed call return stack structure to prevent the branch prediction circuitry using one or more cancelled speculative return addresses of the speculative call return stack structure for predicting the target address of the return branch instruction;

wherein the committed call return stack structure has a smaller capacity for storing return addresses than the speculative call return stack structure.

2. The apparatus according to claim 1, wherein the return address restoration circuitry, when performing the return address restoration, is configured to cause the branch prediction circuitry to use one of the one or more committed return addresses from the committed call return stack in place of a corresponding speculative return address of the speculative call return stack structure for predicting the target address of the return branch instruction.

3. The apparatus according to claim 1, wherein the return address restoration circuitry, when performing the return address restoration, is configured to cause the speculative call return stack structure to retain one or more of the speculative return addresses; and
the branch prediction circuitry is configured to use a retained speculative return address of the speculative call return stack structure for predicting a target address of a further return branch instruction.

4. The apparatus according to claim 1, wherein in response to the pipeline flush event, the return address restoration circuitry is configured to invalidate one or more of the cancelled speculative return addresses which are not able to be restored based on corresponding committed return addresses from the committed call return stack structure; and
in response to determining that a current entry of the speculative call return stack structure to be used for predicting the target address of the return branch instruction is invalidated, the branch prediction circuitry is configured to generate a default prediction for the target address of the return branch instruction.

5. The apparatus according to claim 4, wherein the default prediction is no prediction.

6. The apparatus according to claim 1, wherein the return address restoration circuitry, when performing the return address restoration, is configured to copy the one or more committed return addresses from the committed call return stack to the speculative call return stack structure for use in a subsequent prediction of a return address of a return branch instruction.

7. The apparatus of claim 6, wherein in response to the pipeline flush event being caused by at least one class of misprediction for a calling branch instruction, the return address restoration circuitry is configured to write an additional return address associated with the mispredicted calling branch instruction to the speculative call return stack structure.

8. The apparatus according to claim 6, wherein the return address restoration circuitry, when performing the return address restoration, is configured to overwrite at least one of the one or more cancelled speculative return addresses with the one or more committed return addresses.

9. The apparatus according to claim 8, wherein the return address restoration circuitry is configured to invalidate the one or more cancelled speculative return addresses that are not overwritten with the one or more committed return addresses.

10. The apparatus of claim 6, wherein the speculative return address tracking circuitry is configured to maintain the speculative call return stack structure such that a given speculative return address is associated with a cancellation indicator, wherein:
in a cancellation state, the cancellation indicator indicates that the given speculative return address is to be cancelled in response to the pipeline flush event; and in a non-cancellation state, the cancellation indicator indicates that the given speculative return address is not to be cancelled in response to the pipeline flush event.

11. The apparatus of claim 10, wherein the speculative return address tracking circuitry is configured to write the given speculative return address to the speculative call return stack structure with the speculation indicator in the cancellation state; and the speculative return address tracking circuitry is configured to update the speculation indicator for the given speculative return address to the non-cancellation state in response to detecting that a calling branch instruction associated with setting of the given speculative return address is guaranteed to have been committed.

12. The apparatus according to claim 11, wherein the speculative return address tracking circuitry is configured to detect, in response to detecting that there are no longer any in-flight calling branch instructions, that the calling branch instruction associated with setting of the given speculative return address is guaranteed to have been committed.

13. The apparatus according to claim 11, wherein in response to detecting commitment of an oldest in-flight calling branch instruction, the speculative return address tracking circuitry is configured to update the speculation indicator associated with an oldest speculative return address having the speculation indicator specifying the cancellation state, to set the speculation indicator for the oldest speculative return address to the non-cancellation state.

14. The apparatus of claim 10, wherein the return address restoration circuitry is responsive to the committed call return stack structure having a predetermined number of invalid or empty entries to copy one or more speculative return addresses to the committed call return stack structure.

15. The apparatus of claim 1, wherein each entry of the speculative call return stack structure is associated with a source-control indicator having a speculation state or a flushed state, wherein:

in response to the source-control indicator associated with a current entry of the speculative call return stack structure having the speculation state, the branch prediction circuitry is configured to read a current speculative return address from the current entry of the speculative call return stack structure for predicting the target address of the return branch instruction; and in response to the source-control indicator associated with the current entry having the flushed state, the branch prediction circuitry is configured to read a corresponding committed return address from the committed call return stack structure for predicting the target address of the return branch instruction.

16. The apparatus of claim 15, wherein the speculative return address tracking circuitry is configured to write the given speculative return address to the speculative call return stack structure with the source-control indicator in the speculation state; and the speculative return address tracking circuitry is configured to update the source-control indicator for at least one speculative return address to the flushed state in response to the pipeline flush event.

17. A system comprising:

the apparatus of claim 1, implemented in at least one packaged chip;

at least one system component; and a board, wherein the at least one packaged chip and the at least one system component are assembled on the board.

18. A chip-containing product comprising the system of claim 17 assembled on a further board with at least one other product component.

19. A method comprising:

maintaining a speculative call return stack structure to track speculative return addresses predicted based on speculative program flow;

predicting a target address of a return branch instruction based on the speculative call return stack structure;

maintaining a committed call return stack structure to track committed return addresses detected based on committed program flow;

in response to a pipeline flush event, performing return address restoration based on one or more committed return addresses from the committed call return stack structure and preventing use of one or more cancelled speculative return addresses of the speculative call return stack structure for predicting the target address of the return branch instruction;

wherein the committed call return stack structure has a smaller capacity for storing return addresses than the speculative call return stack structure.

20. A non-transitory computer-readable medium to store computer-readable code for fabrication of an apparatus comprising:

speculative return address tracking circuitry to maintain a speculative call return stack structure to track speculative return addresses predicted based on speculative program flow;

branch prediction circuitry to predict a target address of a return branch instruction based on the speculative call return stack structure;

committed return address tracking circuitry to maintain a committed call return stack structure to track committed return addresses detected based on committed program flow for instructions executed by processing circuitry; and return address restoration circuitry responsive to a pipeline flush event to perform return address restoration based on one or more committed return addresses from the committed call return stack structure to prevent the branch prediction circuitry using one or more cancelled speculative return addresses of the speculative call return stack structure for predicting the target address of the return branch instruction;

wherein the committed call return stack structure has a smaller capacity for storing return addresses than the speculative call return stack structure.

* * * * *